Sept. 1, 1953 F. T. NEWELL 2,650,839
LARGE DIAMETER COUPLING
Filed Aug. 3, 1948 2 Sheets-Sheet 1
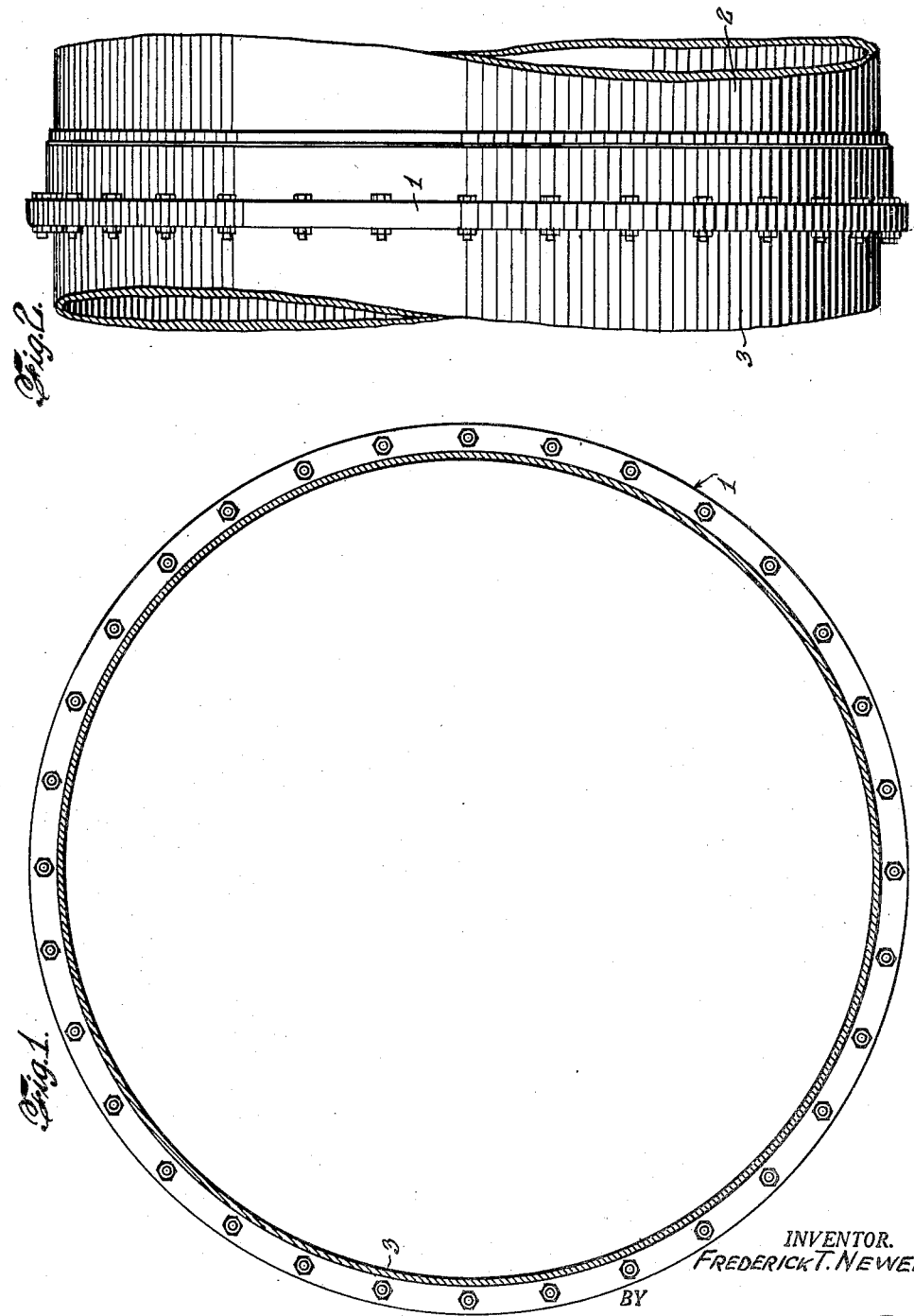
INVENTOR.
FREDERICK T. NEWELL
BY
ATTORNEY

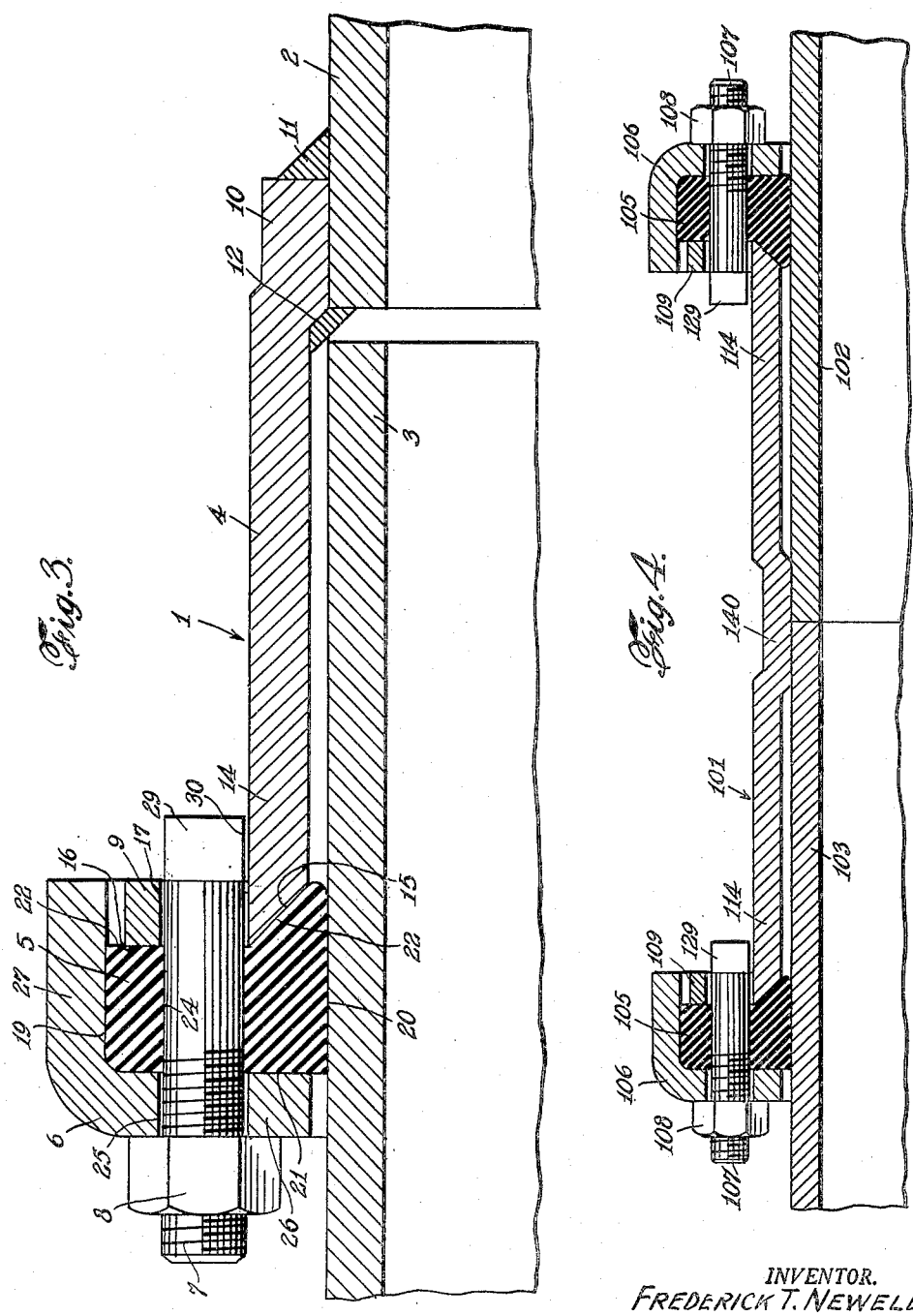

Patented Sept. 1, 1953

2,650,839

UNITED STATES PATENT OFFICE 2,650,839

LARGE DIAMETER COUPLING

Frederick T. Newell, Bradford, Pa., assignor to Dresser Industries, Inc., Cleveland, Ohio, a corporation of Pennsylvania Application August 3, 1948, Serial No. 42,323

5 Claims. (Cl. 285—135)

The present invention relates to gasket packed pipe couplings for pipe sections having plain or unthreaded ends.

As generally constructed, such couplings usually comprise a sleeve or middle ring, as it is commonly called, provided at each end with a packing recess, gaskets or packing rings in the recesses, a pair of metal follower or clamping rings for engaging the gaskets and forcing them into engagement with the pipe sections and the gasket recesses of the middle ring, and bolts for drawing the clamping rings toward the middle ring. These bolts may be a series of short bolts at each end of the coupling connecting one of the clamping rings with an outwardly projecting flange of the middle ring to hold the gasket in tight sealing relationship with the pipe sections and the middle ring. It is necessary for the clamping rings to have portions extending considerably outside of the periphery of the packing recesses and provided with bolt holes. Hence, in order to apply sealing pressure to the gasket, a force is exerted by the bolts at a considerable distance radially from the outer surfaces of the pipe sections and a severe turning moment is imposed on the clamping ring, which must be made strong enough to resist this turning moment.

It is important that such couplings be adaptable to use a packing or gasket material with sufficient resiliency so that it will closely contact the wall of the pipe section and the wall of the gasket recess yet which is strong enough to withstand the pressure in the pipe system without being blown out of the coupling. Further, it is desirable that the bolts extend through the gaskets to hold the gaskets in place in order that the assembled coupling may be stab-fitted in the field. However, any arrangement in which the clamping bolts pass through the gasket has the inherent disadvantage that the bolts tend to inhibit the flow of the gasket under compression, particularly in the radial inward direction, a defect which is particularly critical in cases where the gasket must be made larger than the pipe on which it is to fit for the purpose of allowing the joint to be preassembled for stab-fitting in the field. Due to the relative inefficiency of this type of coupling, particularly with respect to the gasket flow characteristics, a greater number of bolts must be used than in a conventional bolted mechanical coupling in which the clamping bolts are outside the gasket.

In the prior couplings, even with the greater number of bolts, the bolts must be of a substantial size in order to assure adequate gasket compression. It has been found that the volume of gasket on both sides of the bolt must be substantially equal for uniform results, and there must be a substantial radial distance between the bolt shank and the parallel confining surfaces of the joint and pipe. Thus the radial width of the gasket necessarily becomes greater, resulting in an increased gasket area to receive the clamping pressure of the follower rings. With this increased area, only relatively low unit gasket pressures can be developed without the use of still more oversized bolts or a still greater number of bolts, as explained above, which adds still more to the weight and expense of manufacture of the coupling. These difficulties have been overcome to some extent in the construction shown in J. A. Curtis Patent No. 2,197,450 issued April 16, 1940. While the coupling shown in the Curtis patent is generally satisfactory, it has a disadvantage inasmuch as the stripping of a thread on the clamping bolt or on the apertured and threaded follower ring necessitates the complete disassembly of the coupling, and accordingly such construction is most feasible in split couplings.

The present invention aims to overcome the foregoing difficulties and disadvantages by providing a coupling in which the clamping bolts extend through the gaskets to hold them in position so as to facilitate stabbing the pipe sections into the couplings in the field, yet which includes means for assuring adequate gasket compression without the use of oversized bolts or an excessive number of bolts.

Another object of the invention is to provide a pipe coupling which is simple and economical to manufacture, effective in operation and durable in use.

These objects are accomplished by providing a pipe coupling in which the clamping bolts extend through apertures in the gasket to clamp it between a follower ring and an annular flange on the sleeve or middle ring. A configuration is given to the follower ring so that it extends over the outer periphery of the gasket thus preventing the outward expansion of the gasket and causing it to press tightly against the wall of the pipe section and the sleeve or middle ring to provide a high unit gasket pressure making a seal capable of withstanding comparatively high pressures in the pipe sections. In one form of the invention, the coupling is atached to one section of the pipe by making a welded connection therebetween, the construction of the coupling is such that it may be assembled and attached to one end of a pipe section in the factory, being thereafter transported to the field, thus saving time in the field and preventing the possibility of the various parts of the coupling becoming separated or lost. In another form of the invention, the coupling is used to connect two meeting pipe ends without the use of a welded connection.

The construction in accordance with the invention is advantageous also in that the edge of the gasket is protected against the deleterious effects of contact with foreign matter. Even when the coupling is in the loosened condition prior to the tightening of its clamping bolts, the entry of dirt, stones or other foreign matter between the gasket and the follower ring or annular flange is effectively prevented.

Other objects and advantages of the invention will be apparent from the following description and from the accompanying drawings which show, by way of examples, two embodiments of the invention.

In the drawings:

Fig. 1 is an end view of a coupling in accordance with the invention in position on a pipe, the pipe being shown in section.

Fig. 2 is a side view of the coupling shown in Fig. 1.

Fig. 3 is an enlarged partial longitudinal sectional view of the coupling showing one end welded to a pipe having a plain end.

Fig. 4 is an enlarged partial longitudinal sectional view of another embodiment of the coupling in accordance with the invention for connecting the meeting ends of a pair of plain end pipe sections.

Referring to the embodiment of the invention illustrated in Figs. 1–3 inclusive, a coupling 1 is shown attached to an end of a pipe 2, connecting it with the meeting end of an adjacent plain end pipe 3.

The coupling 1 includes a sleeve or middle ring 4, a gasket or packing ring 5, a follower or clamping ring 6, and a plurality of clamping bolts 7 having nuts 8 to clamp the gasket 5 to an annular flange 9 of the middle ring 4. The middle ring or sleeve 4 is of slightly greater diameter than the pipe sections with which it is to be used so that the pipe section may be stabbed into it without binding on the inner surface thereof and so that the coupling 1 may be made up even though the pipe sections are not in perfect alignment.

In the embodiment of the invention shown in Figs. 1–3, the coupling 1 is shown as attached at one end 10 to the end of the pipe section 2 by weld joints 11 and 12. To facilitate the welding operation, the end 10 of the middle ring 4 is made with a somewhat smaller diameter than the remainder of the coupling in order that it will fit tightly in position on the end of the pipe 2. The inner surface of the other end 14 is beveled outwardly as indicated at 15 to provide a gasket recess between the middle ring and the outer wall of pipe 3. The annular flange 9 is formed with a plane inner packing-engaging surface 16 substantially perpendicular to the axis of the coupling and it is also provided with a circular series of bolt holes as indicated at 17.

The gasket or packing ring 5 is formed preferably of rubber or other suitable composition molded in ring form, or alternatively, the gasket may be made in the form of a strip provided with beveled overlapping edges which may be placed together to provide a ring form when the gasket is in position in the coupling. As may be seen in Fig. 3, the packing rings 5 have a cylindrical exterior surface 19, and an inner cylindrical face 20, the diameter of which is slightly greater than the exterior diameter of the pipe section 3 with which the coupling is to be used. The packing ring also has a flat outer follower ring engaging surface 21 and an inner flange engaging surface 22, the inner edge of which is beveled to conform to the shape of the beveled surface 15 of the middle ring. Each packing ring is also provided with a circular series of apertures 24 adapted to register with the bolt holes 17 in the annular flange 9 and so arranged that any split in the ring is positioned between apertures. The packing ring is sufficiently thick that when pressure is applied to it in an axial direction by the follower, it will expand radially inwardly into sealing relationship with the pipe.

The follower or clamping ring 6 for applying sealing pressure to the gasket 5 by pressing it against the face of the annular flange 9, is likewise provided with a circular series of bolt holes 25 adapted to register in alignment with the bolt holes in the gasket and annular flange. Preferably, the ring is made of an L-shaped section in strip form, one leg 26 of the L being drilled to provide the bolt holes 25, the strip thereafter being formed into circular shape to fit in position in the coupling, the ends of the strip being cut off to provide a single split in the ring and arranged so that its meeting ends will lie between adjacent apertures. If desired, the ends are welded together. The other leg 27 of the follower ring is adapted to extend over the gasket or packing ring 5 and over the annular flange 9 in order to provide an outer backing for the exterior cylindrical surface 19 of the gasket 5. The follower is made sufficiently strong to withstand the load of the compression of the gasket under the stress of the bolts without substantial deformation, the outer leg 27 aiding in strengthening the gasket for an equal distribution of pressure over the surface of the gasket.

The clamping bolts 7 are made of a length to extend through the follower ring 6, through the gasket 5 and through the annular flange 9 so as to permit the attachment of nuts 8 on the ends of the bolts to draw the gasket into position. The bolts 7 are fitted with a head 29 having an inner surface 30 which may be either flat or curved to conform to the outer surface of the middle ring 4. The length of the inner surface 30 of the bolts 7 is such that the ends of the surface will contact with the outside of the middle ring 4 and permit the tightening or loosening of the nuts without the need of applying a wrench to hold the bolts from rotating. Alternatively, it is satisfactory to use track head bolts or to provide other means to hold the bolts against turning. In assembling the coupling, the pipe end is stabbed into the preassembled coupling and the nuts 8 are tightened to force the follower ring 6 against the gasket 5 so that its leading edge 22 is pressed into the gasket recess formed between the beveled facing 15 of the middle ring 4 and the outer wall of the pipe. As the gasket 5 is pressed into position, the outer leg 27 of the follower ring prevents the radially outward expansion of the gasket and thereby causes the compressive stresses to be distributed throughout the gasket resulting in a high unit gasket pressure and making a tight seal without the use of oversized bolts or an excessive number of bolts.

In Fig. 4, another embodiment of the invention is illustrated in which corresponding parts are designated by the same reference numerals as Figs. 1-3 with the addition of 100. In Fig. 4, there is shown a coupling 101 adapted to connect the meeting ends 102 and 103 of a pair of pipe sections. This coupling differs from that previously described in that it is adapted to connect two plain end pipe sections without welding. The central portion 140 of the coupling sleeve or middle ring is made of a somewhat smaller diameter corresponding approximately to the diameter of the end 10 of the coupling 1 shown in Figs. 1-3. Outer ends 114 of the coupling are formed similarly to the embodiment previously described, the diameter of the outer ends of the middle ring being somewhat greater than the diameter of the pipe in order to make provision for the use of the coupling on pipe ends which are not the exact size or are not in perfect alignment with each other. While the coupling 101 is particularly adaptable for connecting the ends of plain ended pipe sections, it also may be used as a repair unit to be slipped over a pipe so that the defective portion of the pipe is included between the gasket members.

While the invention has been described and illustrated with reference to specific embodiments, it will be understood that other embodiments may be resorted to without departing from the invention. Other modifications may be made in the construction of the parts, for example, the follower ring 5 while shown and described as being an L section might well be made of any section having an L-shaped inner surface to provide a recess for the gasket 5. While the coupling 1 is shown as attached to the pipe end 2 by use of welded joints 11 and 12, it is obvious that other attachment means might be used such as a threaded connection between the coupling and the pipe. Alternatively, the pipe end 2 might be belled out so that its end forms the sleeve or middle ring 4 of the coupling 1. In the alternative construction, the annular ring 9 might be attached to the belled-out end by welding or the like, or it might be formed integrally with the belled-out end. Likewise the disclosed construction may suggest other equivalent constructions. Therefore, the form of the invention as set out above should be considered as illustrative and not as limiting the scope of the following claims.

I claim:

1. A pipe coupling for large diameter pipe comprising a tubular member adapted to receive an end of a pipe section, said tubular member having a cylindrical outer surface, a radially-projecting annular flange at a free outer end of the tubular member, said flange having a plurality of circumferentially-spaced apertures lying substantially adjacent the outer surface of said tubular member, a follower ring of L-shaped cross section movable axially relatively to the pipe, the L-shaped ring having a substantially cylindrical portion adapted to overlie closely the outer edge of the annular flange of the tubular member, and an inwardly projecting substantially radial portion having a plurality of circumferentially spaced apertures registering with the apertures in said flanges, said follower ring and flange defining a confined annular space at said end of said tubular member, an annular gasket adapted to fit between the annular flange of the tubular member and the follower ring and to fill said annular space, said gasket having an axial thickness greater than half its radial thickness and being provided with a plurality of circumferentially-spaced apertures registering with the apertures in said annular flange and said ring, and clamping bolts fitted with nuts, the bolts adapted to extend through the apertured parts of the coupling including the apertures in the gasket to draw the follower ring against the gasket to compress said gasket in said annular space and to expand said gasket radially inwardly into sealing relationship with the wall of the pipe.

2. A pipe coupling for large diameter pipe comprising a tubular member adapted to receive an end of a pipe section, said tubular member having a cylindrical outer surface, a radially-projecting annular flange at a free outer end of the tubular member, said flange having a plurality of circumferentially-spaced apertures lying substantially adjacent the outer surface of said tubular member, the outer end of the tubular member being beveled outwardly to provide a wedge-shaped gasket recess with the wall of the pipe, a follower ring of L-shaped cross section movable axially relatively to the pipe, the L-shaped ring having a substantially cylindrical portion adapted to overlie closely the outer edge of the annular flange of the tubular member, and an inwardly projecting substantially radial portion having a plurality of circumferentially spaced apertures registering with the apertures in said flange, said follower ring and flange defining a confined annular space at said end of said tubular member, an annular gasket adapted to fit between the annular flange of the tubular member and the follower ring and to fill said annular space, said gasket having an enlarged portion of trapezoidal cross section fitting into said wedge-shaped recess and being provided with a plurality of circumferentially-spaced apertures registering with the apertures in said annular flange and said ring, and clamping bolts fitted with nuts, the bolts adapted to extend through the apertured parts of the coupling including the apertures in the gasket to draw the follower ring against the gasket to compress said gasket in said annular space and to expand said gasket radially inwardly into sealing relationship with the wall of the pipe.

3. A pipe coupling for large diameter pipe comprising a tubular member adapted to receive an end of a pipe section, said tubular member having a cylindrical outer surface, a radially-projecting annular flange at a free outer end of the tubular member, said flange having a plurality of circumferentially-spaced apertures lying substantially adjacent the outer surface of said tubular member, the outer end of the tubular member being beveled outwardly to provide a wedge-shaped gasket recess with the wall of the pipe, a follower ring of L-shaped cross section movable axially relatively to the pipe, the L-shaped ring having a substantially cylindrical portion adapted to overlie closely the outer edge of the annular flange of the tubular member, and an inwardly projecting substantially radial portion having a plurality of circumferentially spaced apertures registering with the apertures in said flange, said follower ring, flange and beveled end of the tubular member defining a confined annular space at said end of said tubular member, said space having a cross section comprising a rectangular outer portion and an enlarged trapezoidal inner portion, an annular gasket adapted to fit between the annular flange of the tubular member and the follower ring and to fill said annular space, said gasket having a plurality of circumferentially-spaced apertures registering with the apertures in said annular flange and said ring, and clamping bolts fitted with nuts, the bolts adapted to extend through the apertured parts of the coupling including the apertures in the gasket to draw the follower ring against the gasket to compress said gasket in said annular space and to expand said gasket radially inwardly into sealing relationship with the wall of the pipe.

4. In a pipe joint, a section of large diameter plain end resilient metallic one-piece tubular member having a wall thickness approximately equal to the wall thickness of the pipe and comprising a cylindrical portion having an inside diameter slightly larger than the outside diameter of the pipe and adapted to receive an end portion of the pipe, an annular flange portion projecting radially outwardly at a free outer end of said cylindrical portion, said flange having a plurality of circumferentially-spaced apertures substantially adjacent the outer surface of said cylindrical portion, a follower ring of L-shaped cross section movable axially relative to the pipe, said L-shaped ring having a substantially cylindrical portion adapted to overlie closely the outer edge of the annular flange of said tubular member, and an inwardly projecting substantially radial portion having a plurality of circumferentially-spaced apertures registering with the apertures in said flange, said follower ring and flange defining a confined annular space at said end of said tubular member, said end of the tubular member being beveled to provide an annular wedge-shaped extension of said annular space between said beveled end and the pipe, an annular gasket adapted to fit between the annular flange of said tubular member and the follower ring and having a wedge-shaped enlargement adapted to fit in said wedge-shaped space, said gasket having a plurality of circumferentially spaced apertures registering with said apertures in said annular flange and said follower ring and bolts adapted to extend through the apertured parts of the coupling and to draw up the follower ring against the gasket to compress the gasket in an axial direction and thereby expand said gasket radially inwardly into sealing relationship with the pipe, the axial thickness of said gasket radially inwardly of said bolts being greater than the axial thickness of said gasket radially outwardly of said bolts.

5. A pipe coupling comprising a one-piece tubular member adapted to receive an end of a pipe section and comprising a cylindrical portion having an inside diameter slightly larger than the outside diameter of the pipe and an annular flange portion projecting radially outwardly at a free outer end of said cylindrical portion, said flange having a plurality of circumferentially-spaced apertures substantially adjacent the outer surface of said cylindrical portion, a follower ring of L-shaped cross section movable axially relative to the pipe, said L-shaped ring having a substantially cylindrical portion adapted to overlie closely the outer peripheral edge of said flange and an inwardly projecting substantially radial portion having a plurality of circumferentially-spaced apertures registering with the apertures in said flange, said follower ring and flange defining a confined annular gasket space at said end of said tubular member, said end of the tubular member being beveled to provide an annular wedge-shaped extension of said gasket spaced between said beveled end and the pipe, an annular gasket adapted to be received and confined in said gasket space, said gasket having an axial thickness greater than half its radial thickness and being provided with a plurality of circumferentially-spaced apertures registering with the apertures in said flange and said ring, and clamping bolts adapted to extend through the apertured parts of the coupling and to draw up the follower ring toward said flange to compress the gasket in an axial direction and thereby expand said gasket radially inwardly into sealing relationship with the pipe to provide fluid-tight seal between said tubular member and a pipe section received therein.

FREDERICK T. NEWELL.

References Cited in the file of this patent

UNITED STATES PATENTS

| Number | Name | Date |
|---|---|---|
| 504,739 | Murray | Sept. 12, 1893 |
| 546,298 | Brice | Sept. 17, 1895 |
| 555,078 | Collins | Feb. 25, 1896 |
| 590,771 | Pike | Sept. 28, 1897 |
| 870,200 | Sheckler | Nov. 5, 1907 |
| 2,009,042 | Buchan | July 23, 1935 |
| 2,108,151 | Teetor | Feb. 15, 1938 |
| 2,108,848 | Engel et al. | Feb. 22, 1938 |
| 2,188,302 | Pfefferle | Jan. 30, 1940 |
| 2,230,468 | Pfefferle | Feb. 4, 1941 |